M. MICHEL  2,283,121
LIGHT RESPONSIVE CONTROL SYSTEM
Filed July 31, 1940
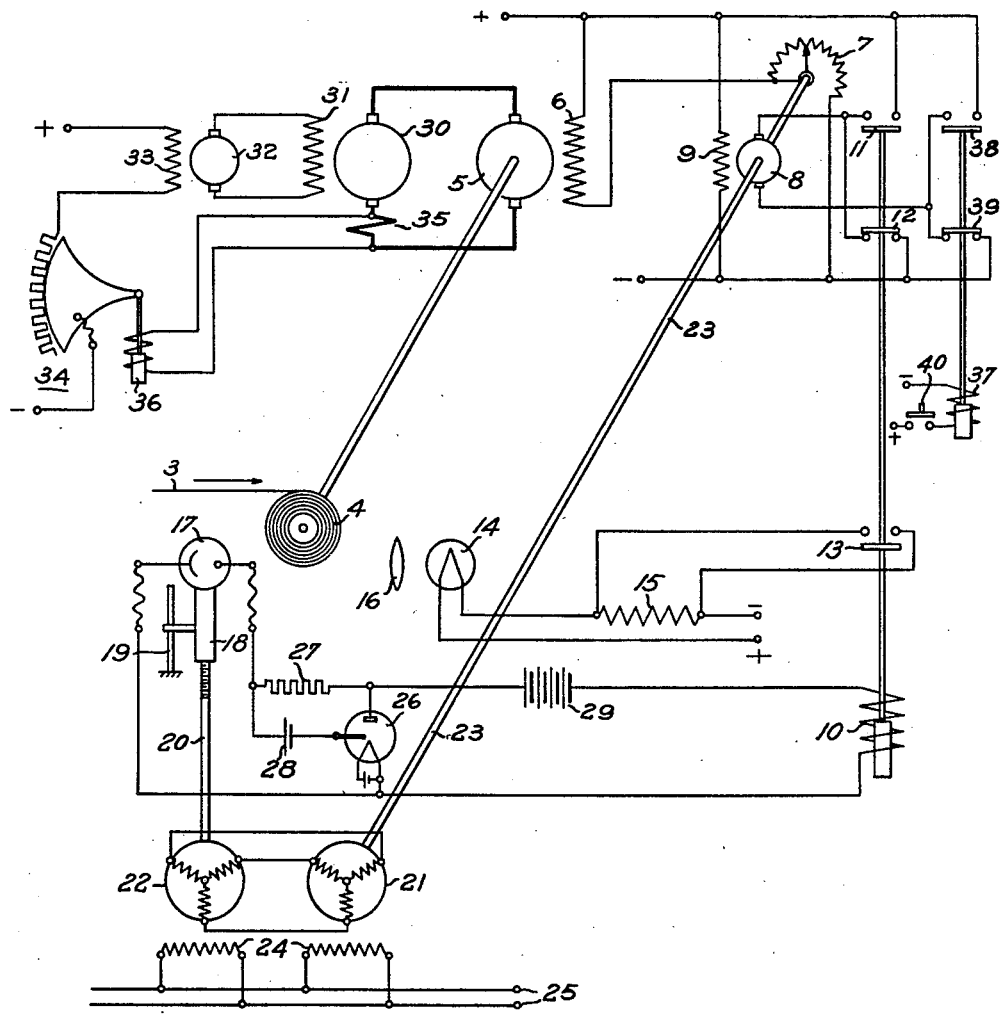
Inventor
M. Michel
by G. J. Pelvin
Attorney Patented May 12, 1942

2,283,121

UNITED STATES PATENT OFFICE 2,283,121

LIGHT RESPONSIVE CONTROL SYSTEM

Mathias Michel, Wauwatosa, Wis., assignor to Allis-Chalmers Manufacturing Company, Milwaukee, Wis., a corporation of Delaware Application July 31, 1940, Serial No. 348,716

14 Claims. (Cl. 242—75)

This invention relates in general to a light responsive control system and relates particularly to a new and improved means for anticipating the follow-up or compensation in a light responsive control system in order to obtain fine increments of control.

In light responsive control systems of the prior art, where a photoelectric tube or similar light responsive device is utilized to regulate electrical apparatus, the mechanical elements utilized to provide follow-up or compensation are considerably slower than the action of the phototube itself and its accompanying electrical control circuits. As a regulating system is only as accurate and as fast as its weakest link, it is desirable to avoid the disadvantages of the time lag inherent in the action of a mechanical follow-up device, in order to obtain faster acting and therefore more accurate regulation.

The present invention has for an object the electrical anticipation of a mechanical follow-up in a light responsive control system.

It is also an object of its present invention to provide in a light responsive regulating system a new and improved means for obtaining a more accurate regulating action, by utilizing small increments or steps of control action.

It is also an object of the present invention to provide a new and improved control system for regulating a dynamo electric machine utilized to tension a strip of winding or unwinding material and controlled by a light responsive device.

Objects and advantages other than those above set forth will be apparent when read in connection with the drawing, in which:

The single figure is a schematic diagram of a control system embodying the present invention.

In the drawing, a strip of material 3 is shown as being wound on a reel 4 by reel motor 5 connected thereto. The reel motor 5 is supplied from a generator 30 having constant current control. The field 6 of the reel motor 5 is controlled by means of the rheostat 7 to maintain the power delivered by the shaft of motor 5 at a constant value for any given speed of the strip 3. By maintaining this power constant, a constant tension is supplied to the strip 3 regardless of the change in lever arm due to the buildup of material on the reel 4.

The regulation of the current in the field 6 is initiated by the building up of material on the reel 4 sufficiently to intercept a beam of light, or a certain percentage thereof, emanating from a light source 14 and focused by a lens 16 to impinge on a photoelectric tube 17. In general, interception of the beam of light by the material built up on reel 4 energizes relay 10 which controls the motor 8 of rheostat 7 to control the excitation of motor 5 to maintain the power output constant. Movement of the motor 8 acts through a position transmitting and receiving device 21, 22, 24, of the Selsyn type, to move the photoelectric tube 17, by means of relatively screw threaded elements 18 and 20 and guide support 19, relative to the source 14 and reel 4, to a position where light from source 14 again impinges thereon, thereby deenergizing relay 10.

When regulation such as above outlined is utilized, the regulating steps may be very coarse because of the inherent time lag in operating the mechanical moving parts. This is especially true of the follow-up or compensation system utilized to move the photoelectric tube to a new position in which the light impinges thereon, due to the time involved in operating relay 10 to actuate its contacts 11 and 12 controlling motor 8, and due to the time lag, both electrical and mechanical, in operating motor 8 and the Selsyn device 21, 22, 24. In order to anticipate this follow-up system and in order to obtain very fine increments of regulating action, the relay 10 is provided with contacts 13 which, with resistance 15, function upon energization of relay 10, to increase the emission of light from source 14. This artificially anticipates the follow-up action and causes the phototube 17 to immediately deenergize relay 10 prior to movement thereof by the follow-up device.

As specifically shown in the illustrated embodiment herein described, the generator 30 supplies a constant current through the armature of motor 5. This armature current is maintained constant by means of regulator 34 having a coil responsive to current flowing through the interpole winding 35 of the generator 30. The regulator 34 therefore regulates field winding 33 of pilot exciter 32 supplying the field 31 of the generator 30.

As the strip 3 builds up on the reel 4 sufficiently to intercept the beam of light from the light source 14, the resistance of the photoelectric tube 17 is increased. As the phototube 17 is in circuit with the resistance 27, battery 29 and relay coil 10, the current in such circuit is decreased, thereby reducing the potential drop across the resistance 27. This change in voltage across resistance 27 acts on the control electrode of the tube 26 to make the tube become conducting. A circuit is thereby completed through the tube 27, coil 10 and the battery 29 which permits sufficient current to flow to operatively energize the relay coil 10 opening contact 12 and closing contact 11.

Opening of contact 12 prevents energization of the motor 8 in the opposite direction by the relay 37. Closing of contact 11 energizes motor 8 through a circuit from the positive connection of the source shown, through contact 11, motor 8, contact 39 of relay 37 to the negative terminal of the source. The motor 8 is thereby energized in a direction to move the contact of rheostat 7 in clockwise direction, thereby increasing the current in field 6 and increasing the counter E. M. F. in motor 5. This increase in counter E. M. F. brings the power output of motor 5 back to the normal value, thus maintaining a constant tension on the strip 3.

In the normal course of events, movement of the shaft 23 of motor 8 in a clockwise direction would at the same time move the rotor of position transmitting device 21 an amount equal to movement of the contact of rheostat 7. Movement of this shaft 23 would transmit a similar movement to a position receiving device 22 having a field 24 energized from a source of alternating current 25 also energizing the field 24 of device 21. Movement of the position receiving device 22 moves shaft 20 which has a screw threaded connection with a base 18 for the photoelectric tube 17. The phototube 17 is therefore moved downwardly guided by a support 19, to a position where a sufficient percentage of light from source 14 again impinges thereon to decrease the resistance thereof sufficiently to de-energize relay 10. Flexible connections to the phototube 17 permit movement thereof.

Prior to the above compensation or follow-up action, an artificial anticipation thereof is effected. When the relay 10 is first energized to effect a control cycle, a contact 13 thereon is closed, thereby short circuiting a resistance 15. The short circuiting of resistance 15, included in series with the light source 14, increases the emanation of light from the source 14. By proper adjustment of the value of resistance 15, this increase in light is sufficient to change the resistance of phototube 17 to immediately de-energize relay 10 and stop movement of the rheostat 7. By adjustment of resistance 15, a control action of the regulating system can be obtained in very fine increments. Fine increment regulation is particularly desirable when winding rolled metal strip, for the surface condition and thickness of the strip are uniformly good only with a constant tension.

This control is especially effective and desirable where a continuing control in one direction is necessary as in the present case where the build-up of material is in one direction on the reel 4. The invention is not limited to single direction control, but can be applied as well to two relays defining a range above and below a neutral position. At the end of the pass, when the material is all wound on the reel 4 and the reel is removed, the rheostat 7 and the position of phototube 17 are returned to the empty reel position thereof by means of relay 37. Energization of relay 37 by means of a push-button 40 opens contact 39 and closes contact 38. Opening of contact 39 prevents energization of motor 8 by the relay 10. Closure of contact 38 energizes motor 8 through contact 12 to run rheostat 7 in a counter-clockwise direction.

The tensioning system described and shown is merely an example of this invention. The invention can as well be applied for tensioning unwinding reels. The artificial anticipation of the follow-up or compensation system in order to obtain fine increments of regulation and thereby great accuracy, may be utilized in any light responsive control system.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a control system, the combination of a source of light, a light sensitive electrical device, an electrical translating device operatively responsive to operation of said light sensitive device, means for varying the amount of light impinging on said light sensitive device, means comprising control circuits whereby said translating device is controlled in response to operation of said varying means, and a follow-up means operatively responsive to operation of said translating device for relative positioning of said light sensitive device, said source and said varying means, with a means operative in response to operation of said translating device and operative prior to operation of said follow-up means for anticipating operation of said follow-up means.

2. In a control system, the combination of a source of light, a light sensitive electrical device, an electrical translating device operatively responsive to operation of said light sensitive device, means for varying the amount of light impinging on said light sensitive device, means comprising control circuits whereby said translating device is controlled in response to operation of said varying means, and a follow-up means operatively responsive to operation of said translating device for relative positioning of said light sensitive device, said source and said varying means, with a means operative prior to operation of said follow-up means for varying the amount of light impinging on said light sensitive device independently of said first said varying means and independently of said follow-up means.

3. In a control system, the combination of a source of light, a light sensitive electrical device, and electrical translating device operatively responsive to operation of said light sensitive device, means for varying the amount of light impinging on said light sensitive device, means comprising control circuits whereby said translating device is controlled in accordance with said varying means, and a follow-up means operatively responsive to operation of said translating device for relative positioning of said light sensitive device, said source and said varying means, with a means operative in accordance with operation of said translating device for varying the emanation of light from said source.

4. In a light responsive control system, a source of light, a light responsive device associated with said source, means for intercepting a portion of the light emanating from said source and impinging on said light responsive device, an electrical translating device in circuit with said light responsive device and controlled in accordance with operation of said intercepting means, a follow-up means operably responsive to operation of said translating device for causing relative positional movement of said light responsive device, said intercepting means and said light source upon operation of said translating device, and means for artificially anticipating operation of said follow-up means.

5. In a light responsive control system, a source of light, a light responsive device associated with said source, means for intercepting a portion of the light emanating from said source and impinging on said light responsive device, an electrical translating device in circuit with said light responsive device and controlled in accordance with operation of said intercepting means, a follow-up means operably responsive to operation of said translating device for causing relative positional movement of said light responsive device, said intercepting means and said light source upon operation of said translating device, and means comprising a relay operable only upon operation of said translating device, to vary the emanation of light from said source.

6. In a control system, a reel for strip material, a dynamo-electric machine connected to said reel, means for controlling said dynamo-electric machine to maintain a predetermined tension on said strip, said means comprising a light source, and a light sensitive device positioned so that the amount of said material on said reel controls the percentage of light from said source impinging on said device, and means providing for operation of said controlling means in small increments, said last said means comprising a means for varying the emanation of light from said source.

7. In a control system, a reel for strip material, a dynamo-electric machine connected to said reel, means for controlling said dynamo-electric machine to maintain a predetermined tension on said strip, said means comprising a light source, and a light sensitive device positioned so that the amount of said material on said reel controls the percentage of light from said source impinging on said device, and means operable only after operation of said light sensitive device for providing momentary cessation of operation of said controlling means.

8. A light responsive control system comprising a light responsive device, a source of light, a follow-up system for repositioning said device, and means for anticipating the effect of said follow-up system on said device prior to operation thereof, said anticipating means comprising means for momentarily varying the emanation of light from said source.

9. A light responsive control system comprising a light responsive device, a source of light, a follow-up system for repositioning said device, and means for anticipating the effect of said follow-up system, said means comprising means for varying the emanation of light from said source prior to operation of said follow-up system.

10. A light responsive control system comprising a light responsive device, a source of light, an electrical device, means for controlling said electrical device in accordance with the amount of light from said source impinging on said light responsive device, and means for varying the emanation of light from said source, said means comprising a relay operable in response to the operation of said electrical device.

11. A light responsive control system comprising a light responsive device, a source of light, an electrical device, means for controlling said electrical device in accordance with the amount of light from said source impinging on said light responsive device, and means for varying the emanation of light from said source in accordance with the operation of said electrical device, said emanation varying means comprising a current varying means in circuit with said light source.

12. In a control system, a reel for strip material, a dynamo-electric machine connected to said reel, means for controlling the energization of said dynamo-electric machine to maintain constant the power output thereof to said reel, said means comprising a light sensitive device and a light source positioned relative to said reel so that the strip material on said reel controls the light from said source impinging on said light sensitive device, said means further comprising a relay in circuit with said light sensitive device, means whereby said relay varies the energization of said dynamo-electric machine, and means whereby said relay controls the emanation of light from said source.

13. In a control system, a reel for strip material, a motor for winding said strip material on said reel, an incandescent lamp, a light sensitive device positioned to intercept a portion of light from said lamp dependent upon the amount of said strip material on said reel, a relay in circuit with said light sensitive device, means comprising a motor device controlled by said relay to vary the excitation of said motor, means controlled by said motor device for repositioning said light sensitive device relative to said reel and said lamp, and means comprising a resistance in circuit with said lamp for varying the energization thereof upon operation of said relay.

14. In a control system, a reel for strip material, a winding motor for said reel, regulating means for controlling said motor, a source of light, a light responsive device positioned so that the build-up of material on said reel controls the percentage of light from said source impinging on said device to operatively energize said regulating means, a follow-up system operable upon operation of said regulating means to relatively reposition said reel, said light source and said device, and means comprising a relay energized simultaneously with the energization of said regulating means and prior to operation of said follow-up system for controlling the amount of light impinging on said device so as to operatively de-energize the same.

MATHIAS MICHEL.